(12) United States Patent
Jang

(10) Patent No.: US 11,854,574 B2
(45) Date of Patent: Dec. 26, 2023

(54) INTERACTIVE CHATBOT ALGORITHM BETWEEN HUMAN AND COMPANION ANIMALS THROUGH ANALYSIS OF COMPANION ANIMAL'S EMOTIONS AND STATES BASED ON COMPANION ANIMAL'S VOICE AND ACTIVITY INFORMATION

(71) Applicant: PETPULS LAB INC., Anyang-si (KR)

(72) Inventor: Yun Ock Jang, Anyang-si (KR)

(73) Assignee: PETPULS LAB INC., Anyang-si (KR)

( * ) Notice: Subject to any disclaimer, the term of this patent is extended or adjusted under 35 U.S.C. 154(b) by 321 days.

(21) Appl. No.: 17/459,018

(22) Filed: Aug. 27, 2021

(65) Prior Publication Data
US 2022/0165294 A1    May 26, 2022

(30) Foreign Application Priority Data
Nov. 20, 2020    (KR) .................. 10-2020-0156847

(51) Int. Cl.
| | |
|---|---|
| *G10L 25/63* | (2013.01) |
| *A01K 29/00* | (2006.01) |
| *H04L 51/02* | (2022.01) |
| *H04L 67/12* | (2022.01) |
| *G10L 17/26* | (2013.01) |

(52) U.S. Cl.
CPC .......... *G10L 25/63* (2013.01); *A01K 29/005* (2013.01); *H04L 51/02* (2013.01); *H04L 67/12* (2013.01); *G10L 17/26* (2013.01)

(58) Field of Classification Search
CPC .................. G10L 25/63; G10L 17/26
See application file for complete search history.

(56) References Cited

U.S. PATENT DOCUMENTS

| | | | |
|---|---|---|---|
| 6,761,131 B2* | 7/2004 | Suzuki ............... | A01K 29/00 704/E17.002 |
| 9,737,049 B2* | 8/2017 | Trottier ............... | A01K 5/0291 |
| 2011/0082574 A1* | 4/2011 | Pachet ............... | A01K 29/005 700/94 |
| 2017/0097169 A1* | 4/2017 | Azevedo ............. | G05B 15/02 |

* cited by examiner

*Primary Examiner* — Feng-Tzer Tzeng
(74) *Attorney, Agent, or Firm* — Dinsmore & Shohl LLP; Yongsok Choi, Esq.

(57) ABSTRACT

A method of operating a chatbot based on a companion animal's emotion by using a user terminal, according to an embodiment of the present disclosure includes receiving voice information and activity amount information from an TOT device when receiving a chatting value from a user; calculating a basic emotion variable, a situation variable, and a behavior pattern variable based on the voice information and the activity amount information; and searching for an answer value corresponding to the chatting value under conditions of the basic emotion variable, the situation variable, and the behavior pattern variable to output the searched answer value, wherein the TOT device includes a microphone and a behavior sensor and generates the voice information and the activity amount information by detecting a crying sound and a behavior of the companion animal wearing the TOT device.

15 Claims, 9 Drawing Sheets

FIG. 6B
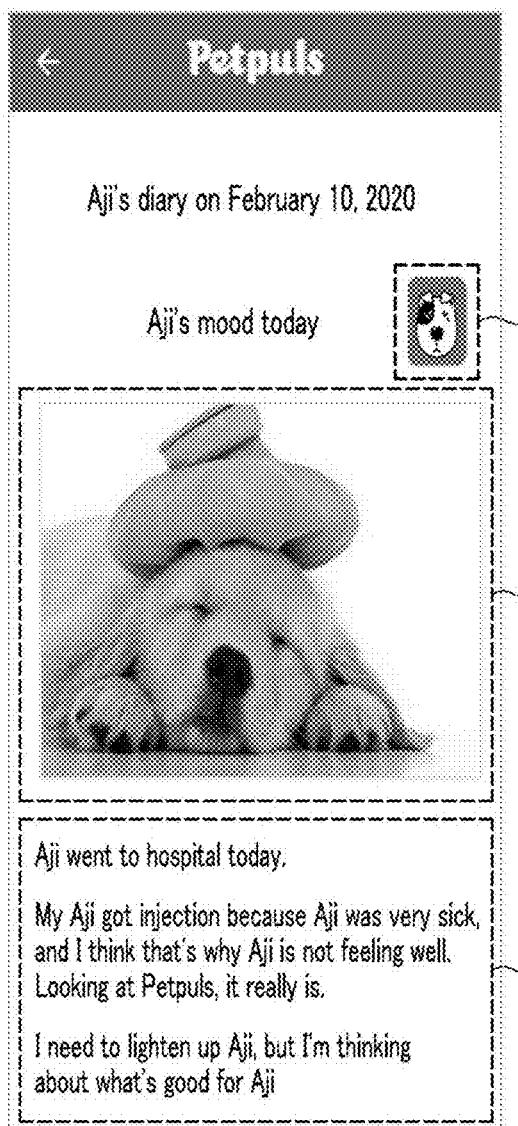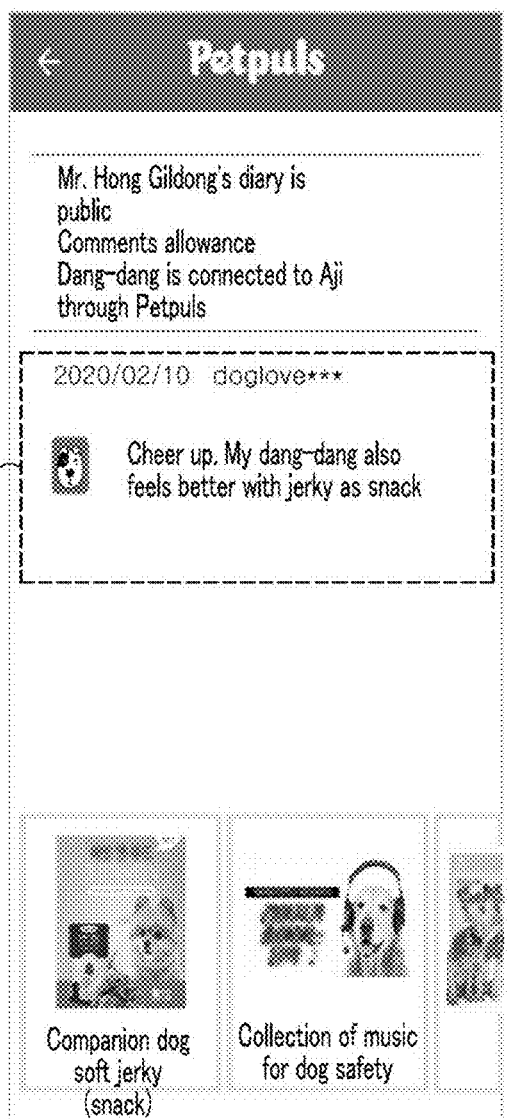

INTERACTIVE CHATBOT ALGORITHM BETWEEN HUMAN AND COMPANION ANIMALS THROUGH ANALYSIS OF COMPANION ANIMAL'S EMOTIONS AND STATES BASED ON COMPANION ANIMAL'S VOICE AND ACTIVITY INFORMATION

CROSS-REFERENCE TO RELATED APPLICATIONS

The present application claims priority under 35 U.S.C 119(a) to Korean Patent Application No. 10-2020-156847, filed on Nov. 20, 2020, which is incorporated herein by reference in its entirety.

BACKGROUND

1. Technical Field

The present disclosure relates to an interactive chatbot algorithm between human and companion animals through analysis of companion animal's emotions and states based on companion animal's voice and activity information.

2. Related Art

In recent years, the number of nuclear families or people living alone has been increased, the number of people who keep companion animals such as dogs and cats has also been increased. In line with this trend, products for the companion animals are also continuously developed.

Although various products are developed for the sake of convenience of companion animals, a focus is on pet products that may easily keep or play with companion animals. Accordingly, many pet products for understanding psychology or states of companion animals have been developed, but this has been implemented only in a way that a user detects data based on a unilateral motion and outputs a result value.

This method has a low accuracy because a device is based on first stored data and has a limitation in determining only an intention of the companion animal, not a real conversation, in that a result value for the sensed data is calculated only when a user operates the device.

SUMMARY

The present disclosure provides a device that generates big data by receiving a behavior of a companion animal in various situations through an Internet of things (IOT) device mounted on the companion animal and determines an intention of the companion animal based on the big data when receiving a specific behavior of the companion animal.

According to an embodiment of the present disclosure, a method of operating a chatbot based on a companion animal's emotion by using a user terminal, includes receiving voice information and activity amount information from an Internet of things (IOT) device when receiving a chatting value from a user; calculating a basic emotion variable, a situation variable, and a behavior pattern variable based on the voice information and the activity amount information; and searching for an answer value corresponding to the chatting value under conditions of the basic emotion variable, the situation variable, and the behavior pattern variable to output the searched answer value, wherein the IOT device includes a microphone and a behavior sensor and generates the voice information and the activity amount information by detecting a crying sound and a behavior of the companion animal wearing the IOT device.

In addition, a chatting interface for performing one of reception and display of a text from the user before receiving the voice information and the activity amount information may be provided, and the chatting interface may include a chatting region in which chatting details are uploaded and a keyboard region in which the chatting value is generated.

In addition, calculating the basic emotion variable, the situation variable, and the behavior pattern variable may include calculating the basic emotion variable by analyzing the voice information; calculating the situation variable based on the activity amount information; and calculating the behavior pattern variable based on the basic emotion variable and the situation variable.

In addition, calculating the basic emotion variable may include analyzing the voice information to calculate the basic emotion variable representing a score for the companion animal's plurality of emotions which include at least stability, anxiety, anger, sadness, and happiness.

In addition, calculating the situation variable may include analyzing the activity amount information to calculate situational information on a situation that the companion animal currently experiences, and the situation information may include an environmental context value for the companion animal's neighborhood, a conversational history context value, and a physical context value.

In addition, the situation information may be corrected by applying a chatting log generated by chatting previously conducted in a process of calculating the conversational history context value.

In addition, calculating the behavior pattern variable may include calculating the behavior pattern variable by analyzing the basic emotion variable and the situation variable and determining a behavior that the companion animal currently performs, and a type of the behavior that the companion currently performs may include an extroverted behavior, a passive behavior, and an aggressive behavior.

In addition, searching for the answer value may include generating an answer list corresponding to the chatting value; classifying a plurality of answer values in the answer list based on the basic emotion variable, the situation variable, and the behavior pattern variable; and calculating an answer value having more than a preset comparison value with the basic emotion variable, the situation variable, and the behavior pattern variable from the plurality of answer values.

In addition, in generating the answer list, the answer list may be generated by extracting a word constituting the chatting value and by searching for an answer value associated with the extracted word.

In addition, the answer value may be given a value corresponding to each variable of the basic emotion variable, the situation variable, and the behavior pattern variable, and in calculating the answer value, the comparison value may be calculated by comparing the basic emotion variable, the situation variable, and the behavior pattern variable calculated based on the voice information and the activity amount information with a variable of the answer value.

In addition, after searching for an answer value, whether or not the answer value is suitable may be received from the user, and when the answer value is suitable for the chatting value, the chatting value and the voice information and activity amount information may be stored to correct an algorithm for calculating the basic emotion variable, the situation variable, and the behavior pattern variable.

In addition, the IOT device may include a global positioning system (GPS) module to generate position information, and in calculating a basic emotion variable, a situation variable, and a behavior pattern variable, the position information may be further received from the IOT device to correct the situation variable.

According to another embodiment of the present disclosure, a chatbot system includes an IOT device including a microphone and a behavior sensor to generate voice information and activity amount information by detecting a crying sound and behavior of a companion animal worn to the IOT device; and a user terminal that, when a chatting value is input from a user, receives the voice information and the activity amount information from the IOT device, calculates a basic emotion variable, a situation variable, and a behavior pattern variable based on the voice information and the activity amount information, searches for an answer value corresponding to the chatting value under conditions of the basic emotion variable, the situation variable, and the behavior pattern variable, and outputs the searched answer value.

In addition, the IOT device may include a GPS module to provide position information to the user terminal, and the user terminal may correct the situation variable based on the position information.

According to another embodiment of the present disclosure, a computer-readable storage medium includes a program for performing the method of operating the chatbot based on the companion animal's emotion described above.

According to an embodiment of the present disclosure, there is provided a device that generates big data by receiving a behavior of a companion animal in various situations through an IOT device mounted on the companion animal and determines an intention of the companion animal based on the big data when receiving a specific behavior of the companion animal.

In addition, for a novice owner who may not understand a companion dog's emotion or condition, a device according to the present disclosure detects the companion dog's emotion very accurately and informs the owner thereof through a chatbot.

A device according to the present disclosure may cause an owner to understand a companion dog better and to treat the companion dog as if the owner talks to a human, and thus, the owner may have an affinity with the companion dog.

BRIEF DESCRIPTION OF THE DRAWINGS

Various embodiments of the present disclosure will become more apparent in view of the attached drawings and accompanying detailed description, in which:

FIG. 6B is a diagram illustrating an example of an additional service provided in connection with a chatbot and an interface therefor, according to an embodiment of the present disclosure;

DETAILED DESCRIPTION OF THE EMBODIMENTS

Figure 1:
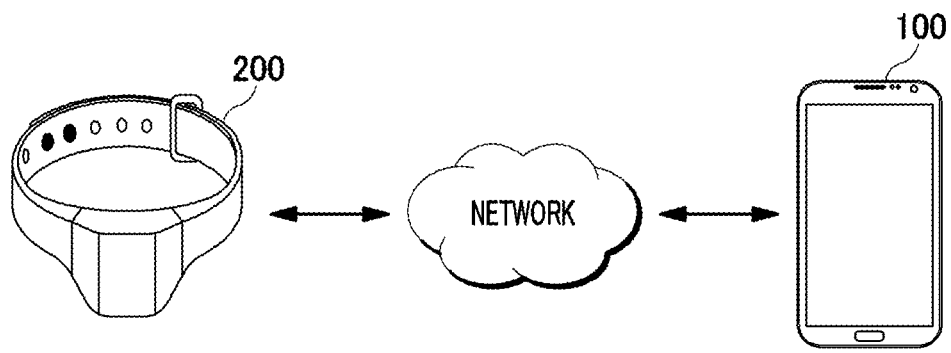
FIG. 1 is a diagram illustrating a configuration of a system that is performed by a user terminal and an Internet of things (IOT) device worn on a companion animal and provides a chatbot based on a companion animal's emotion, according to an embodiment of the present disclosure.

Hereinafter, embodiments of the present disclosure will be described in detail with reference to the accompanying drawings such that those skilled in the art may easily implement the present disclosure. However, the present disclosure may be implemented in several different forms and is not limited to the embodiments described herein. In addition, in order to clearly describe the present disclosure, portions irrelevant to the description are omitted in the drawings, and similar reference numerals or symbols are attached to similar portions throughout the specification.

Throughout the specification, when a portion is "connected" to another portion, this includes not only a case of being "directly connected" but also a case of being "electrically connected" with another element interposed therebetween. In addition, when a portion "includes" a certain component, this means that the portion may further include other components, rather than excluding other components, unless otherwise stated, and it is to be understood that possibility of presence or addition of one or more other features or numbers, steps, operations, configuration elements, components, or combinations thereof are not precluded.

The following embodiments are detailed descriptions for helping understanding of the present disclosure, and do not limit the scope of the present disclosure. Accordingly, a disclosure of the same scope for performing the same function as the present disclosure is included in the scope of the present disclosure.

FIG. 1 is a diagram illustrating a configuration of a system that is performed by a user terminal and an Internet of things (IOT) device worn on a companion animal and provides a chatbot based on a companion animal's emotion, according to an embodiment of the present disclosure.

Referring to FIG. 1, the system may include a user terminal 100 and an IOT device 200. In this case, the user terminal 100 and the IOT device 200 may be connected to each other by wire or wirelessly through a communication network.

In the system according to an embodiment of the present disclosure, when a user inputs a chatting value to the user terminal 100, the user terminal 100 receives voice information and activity amount information from the IOT device 200.

Thereafter, the user terminal 100 converts the voice information and the activity amount information into a basic emotion variable, a situation variable, and a behavior pattern variable, and displays an answer value corresponding to a chatting value input by a user on a display.

In this case, the voice information may mean a crying sound of a companion animal, and the activity amount information may be a value obtained by detecting an action performed by the companion animal. In addition, the basic emotion variable, the situation variable, and the behavior pattern variable are variables for understanding emotions, intentions, and behaviors that companion animals feel through the voice information and the activity amount information, and are described below again with reference to FIG. 3.

Therefore, a chatbot according to the present disclosure provides an answer to the user's question and provides an answer containing the companion animal's emotions at the time. For example, when a chatting value input by the user asks "how is the weather today?", and if the companion animal is in a good mood, an answer value is displayed as "today's weather is sunny and good for going out", and in contrast to this, if the companion animal is in a bad mood, the answer value is displayed as "it is sunny today, but I don't want to go out". That is, it is characterized in that a context or a tone is slightly different depending on the companion animal's condition even when the answer value has the same topic.

According to an embodiment of the present disclosure, the user terminal 100 refers to a terminal used by a user to drive a chatbot.

Figure 6A:
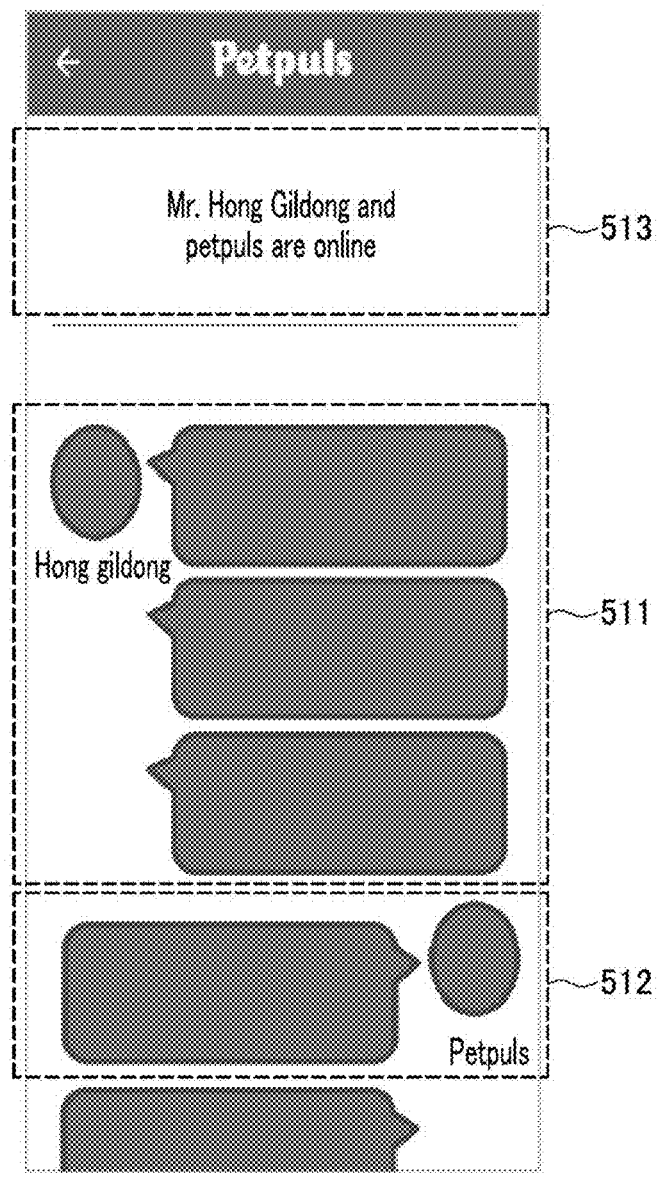
FIG. 6A is a diagram illustrating an example of an additional service provided in connection with a chatbot and an interface therefor, according to an embodiment of the present disclosure.

In this case, the user terminal 100 provides a chatting interface illustrated in FIG. 6A to input a chatting value or to check an answer value therefor.

Therefore, when a chatting value is input by a user, the user terminal 100 receives voice information and activity amount information from the IOT device 200 to generate (or search for) an answer value corresponding to the chatting value and display the chatting value on a display.

In addition, an application for providing the chatbot based on a companion animal's emotion to the user terminal 100 may be an application built in the user terminal 100, or an application downloaded from an application distribution server to be installed in the user terminal 100.

In addition, the user terminal 100 refers to a communication terminal capable of using a terminal application in a wired/wireless communication environment. Here, the user terminal 100 may be a user's portable terminal. Although the user terminal 100 is illustrated as a smart phone which is a type of portable terminal in FIG. 1, the idea of the present disclosure is not limited thereto, and as described above, the user terminal 100 may be used as a terminal capable of mounting a terminal application without limitation.

In more detail, the user terminal 100 may include a handheld computing device (for example, a personal digital assistant (PDA), an email client, or so on), any type of cell phone, or any other type of computing or communication platform, but the present disclosure is not limited thereto.

According to an embodiment of the present disclosure, the IOT device 200 is worn on a companion animal to measure a companion animals' crying sound or behavior and generate voice information and activity amount information and transmits the voice information and activity amount information to the user terminal 100.

In this case, the voice information is information generated by measuring a companion animal's crying sound, and a module such as a microphone has to be prepared in the IOT device 200.

In addition, the IOT device 200 has to include a communication module to enable data transmission/reception with the user terminal 100.

In addition, although the IOT device 200 is illustrated in a form of a leash in FIG. 1, a form in which the IOT device 200 may be mounted in addition to the neck may be used without limiting the scope of the present disclosure, depending on species or a size of the companion animal.

In addition, the communication network refers to a communication network that provides an access path such that the IOT device 200 may transmit and receive data after accessing the user terminal 100 (this may be used in reverse). The communication network may include, for example, wired networks such as local area networks (LANs), wide area networks (WANs), metropolitan area networks (MANs), and integrated service digital networks (ISDNs), or wireless networks such as wireless LANs, code division multiple access (CDMA), the Bluetooth, and satellite communication, but the scope of the present disclosure is not limited thereto.

Figure 2:
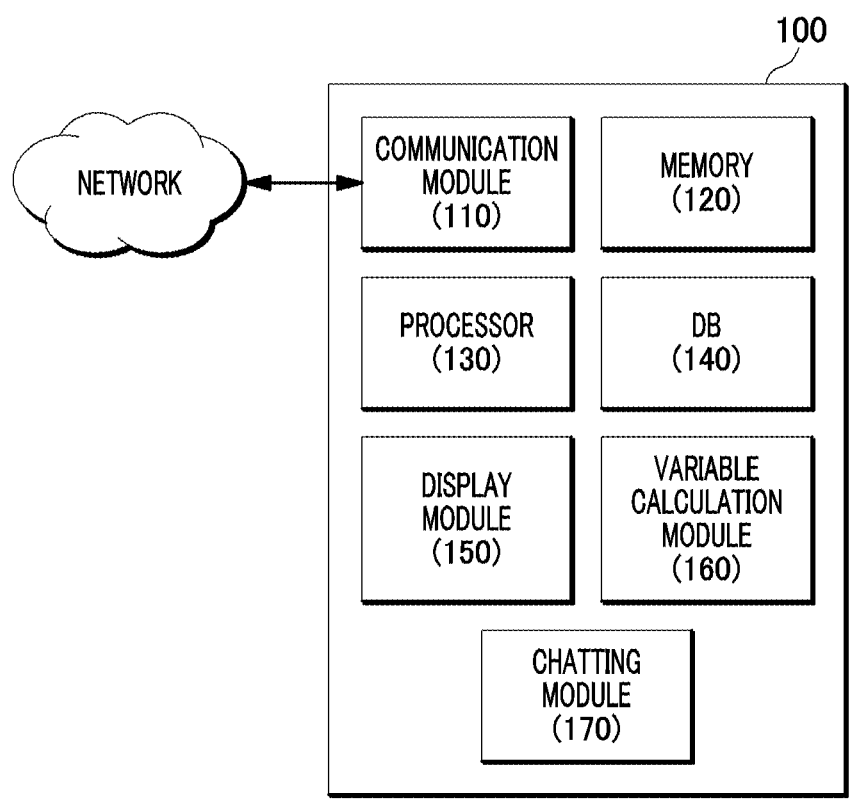
FIG. 2 is a diagram illustrating the configuration of a user terminal according to an embodiment of the present disclosure.

FIG. 2 is a diagram illustrating a configuration of the user terminal 100 according to an embodiment of the present disclosure.

Referring to FIG. 2, the user terminal 100 according to an embodiment of the present disclosure includes a communication module 110, a memory 120, a processor 130, a database 140, a display module 150, a variable calculation module 160, and a chatting module 170.

In detail, the communication module 110 provides a communication interface necessary to provide a transmission/reception signal between the user terminal 100 and the IOT device 200 in a form of packet data in connection with the communication network. Furthermore, the communication module 110 may receive a data request from the IOT device 200 and transmit data in answer thereto.

Here, the communication module 110 may include hardware and software necessary for transmitting and receiving signals such as control signals or data signals through wired/wireless connection with other network devices.

The memory 120 stores a program for operating a chatbot based on a companion animal's emotion. In addition, the memory 120 performs a function of temporarily or permanently storing data processed by the processor 130. Here, the memory 120 may include magnetic storage media or flash storage media, but the scope of the present disclosure is not limited thereto.

The processor 130 is a kind of central processing unit and controls the entire process of operating the chatbot based on the companion animal's emotion. Respective steps performed by the processor 130 will be described below with reference to FIGS. 3 to 5.

Here, the processor 130 may include all kinds of devices capable of processing data, such as a processor. Here, the "processor" may refer to a data processing device that is embedded in hardware and includes, for example, a physically structured circuit to perform a function expressed as a code or an instruction included in a program. For example, the data processing device embedded in the hardware described above may include a microprocessor, a central processing unit (CPU), a processor core, a multiprocessor, an application-specific integrated circuit (ASIC), and a field programmable gate array (FPGA), but the scope of the present disclosure is not limited thereto.

The database 140 basically stores an answer value corresponding to a chatting value and stores data for calculating a basic emotion variable, a situation variable, and a behavior pattern variable according to voice information and activity amount information of a companion animal.

In addition, in an optional embodiment, the database 140 may store logs of previously performed chatting and answers. In this case, the stored logs may be used to quickly find a chatting value input by a user thereafter and an answer value corresponding to the voice information and activity amount information received from the IOT device, or may be used to strengthen an algorithm for generating the answer value.

Although not illustrated in FIG. 2, some of the answer value corresponding to the chatting value, and the data for calculating the basic emotion variable, the situation variable, and the behavior pattern variable according to the companion animal's voice information and activity amount information may be stored in a database (not illustrated) physically or conceptually separated from the database 140. That is, in an optional embodiment, the database 140 may be omitted and a chatbot may be operated by receiving the data from an external server.

In an optional embodiment, the database 140 divides the companion animal's behavior, exercise, activity amount, voice, sleep pattern, and so on in a specific situation for each dog breed/size/age, and stores the same as text and images.

In addition, the database 140 separately stores the companion animal's animal identification information received from a user, identification information of the IOT device 200 corresponding to the animal identification information, and so on, and stores data received from a specific companion animal by matching the animal identification information, thereby configuring big data.

The display module 150 is included in the user terminal 100 and corresponds to a module for visually providing a service including a chatting interface.

In this case, the display module 150 may also include a touch-based input/output module, and may provide only a simple display function when a separate input device is provided in the user terminal 100.

The variable calculation module 160 corresponds to a module for calculating a basic emotion variable, a situation variable, and a behavior pattern variable, based on voice information and activity amount information received from the IOT device 200.

In this case, a method of calculating each variable by using the variable calculation module 160 will be described below with reference to FIG. 4.

The chatting module 170 corresponds to a module for generating an answer value based on a chatting value input by a user.

In this case, the chatting module 170 generates (searches for) an answer value suitable for a companion animal's state based on a plurality of variables generated by the variable calculation module 160, and provides the answer value to a user through the display module 150.

In this case, a method of calculating an answer value by using the chatting module 170 will be described below with reference to FIG. 5.

Figure 3:
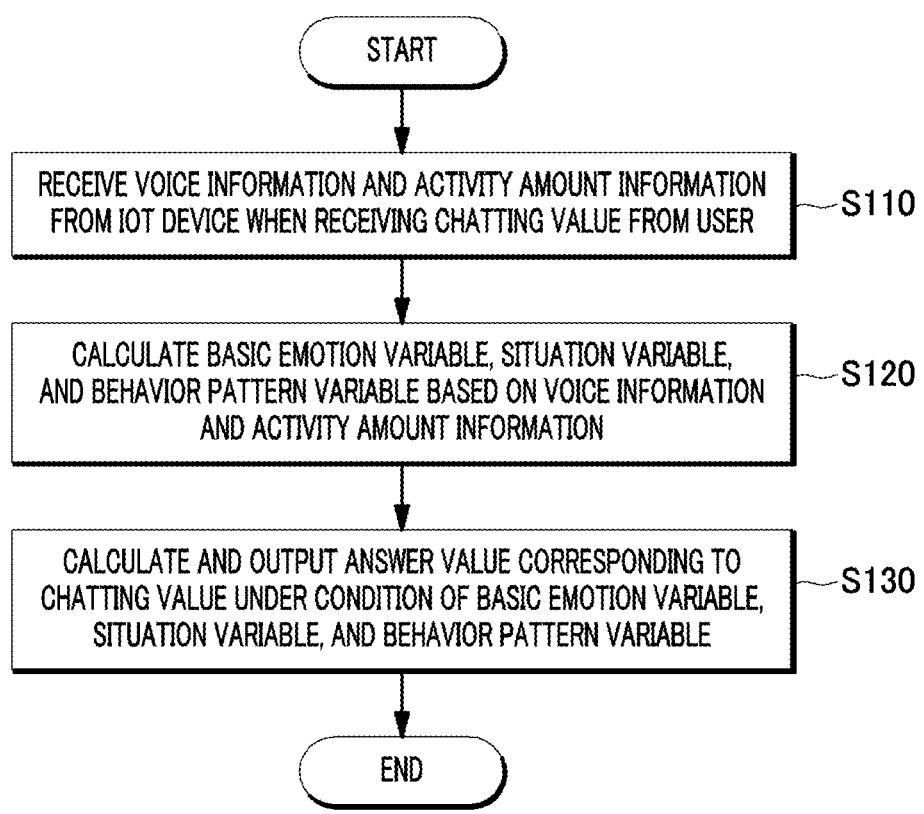
FIG. 3 is an operational flowchart illustrating a method of providing a chatbot based on a companion animal's emotion, according to an embodiment of the present disclosure.

FIG. 3 is an operational flowchart illustrating a method of providing a chatbot based on a companion animal's emotion, according to an embodiment of the present disclosure.

Referring to FIG. 3, when receiving a chatting value from a user, the user terminal 100 receives voice information and activity amount information from the IOT device 200 (S110).

In this case, the user terminal 100 provides a chatting interface illustrated in FIG. 6A before step S110.

In this case, the chatting interface may include chatting regions 511 and 512 in which chatting details are uploaded and a keyboard region (not illustrated) for generating chatting values.

In this case, the chatting regions are divided into a chatting value region 511 in which a chatting value input by a user is displayed and an answer value region 512 in which an answer value for a chatting value is displayed.

In addition, the number of people participating in chatting is displayed on a participant region 513, and in addition to an owner of the user terminal 100, a user of another user terminal 100 may participate to use a chatbot together as necessary.

In addition, the chatting interface illustrated in FIG. 6A is implemented in a form similar to KakaoTalk which is a generally serviced social network service (SNS), and when a user may check a chatting value input by the user and an answer value therefor, various forms are available, and thus, a design of the chatting interface does not limit the scope of the present disclosure.

The user terminal 100 calculates a basic emotion variable, a situation variable, and a behavior pattern variable based on voice information and activity amount information (S120).

In this case, in an optional embodiment, when a global positioning system (GPS) module is included in the IOT device 200 to generate position information, the user terminal 100 further receives the position information from the IOT device 200 to correct a situation variable.

Finally, the user terminal 100 searches for an answer value corresponding to the chatting value under conditions of the basic emotion variable, the situation variable, and the behavior pattern variable, and outputs the searched answer value (S130).

After step S130, the user terminal 100 receives from the user whether or not the answer value is suitable.

When the answer value is suitable for the chatting value, the user terminal 100 stores the chatting value, the voice information, and the activity information and corrects an algorithm for calculating the basic emotion variable, the situation variable, and the behavior pattern variable.

In addition, after step S120, the user terminal 100 accumulates data that a companion animal feels or behaves according to situations in the process of performing steps S110 to S120 to generate big data. In this case, the big data may further include an image or a voice file as well as text, and the image, the voice file, or so on may be provided as the answer value.

In an additional embodiment, when the IOT device 200 includes a speaker, the user terminal 100 may directly transmit voice data (human's voice) received from a user to the speaker of the IOT device 200. In another additional embodiment, when a text to speech (TSS) function is included in the user terminal 100, the user terminal 100 may convert a chatting value input by a user into an owner's voice (user) to provide the voice to the speaker of the IOT device 200 and may generate voice information and activity information by measuring a companion animal's answer to a voice output from the speaker.

In another optional embodiment, a companion animal's conversation scenario is made based on the voice information and activity amount information detected by the IOT device 200 from the companion animal at the time set by a user and based on emotion, an activity amount, and sleep information analyzed through big data established in the database 140, and a situation in which a user communicates with a companion animal may be implemented virtually. That is, a scenario for a specific situation is assumed, and when a value detected from the companion animal matches the scenario for the specific situation, chatting may be made. In addition, another companion animal and an owner thereof may participate in the chatting to conduct a conversation together.

Figure 4:
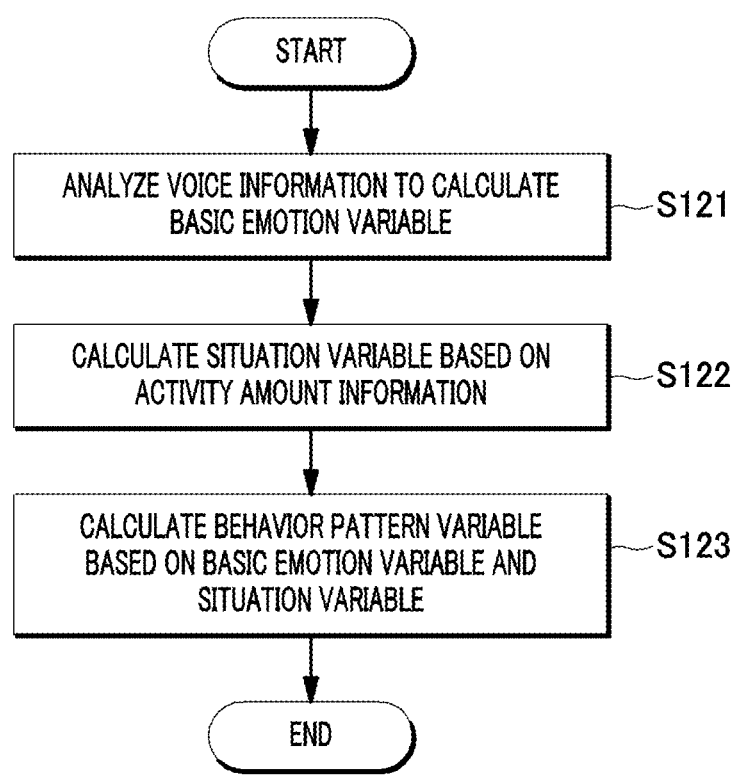
FIG. 4 is an operational flowchart illustrating a process of calculating variables for driving a chatbot, according to an embodiment of the present disclosure.

FIG. 4 is an operational flowchart illustrating a process of calculating variables for driving a chatbot, according to an embodiment of the present disclosure.

Referring to FIG. 4, the user terminal 100 analyzes voice information to calculate a basic emotion variable (S121).

In this case, the user terminal 100 analyzes the voice information to calculate the basic emotion variables representing scores for a plurality of emotions that a companion animal may have.

In this case, the plurality of emotions may include at least stability, anxiety, anger, sadness, and happiness, and the basic emotion variables may be advanced by additionally calculating variables for other emotions.

The user terminal 100 calculates a situation variable based on activity amount information (S122).

In this case, the user terminal 100 analyzes the activity amount information to acquire situation information on a situation in which a companion animal currently experiences, and the situation information includes an environmental context value for the companion animal's neighborhood, a conversational history context value, and a physical context value.

First, the environmental context value is related to a current situation surrounding a companion animal, and for example, when a companion dog's activity increases rapidly in a short time, it may be recognized as a situation in which the companion is chased by someone, and when the companion dog makes a warning sound in a low voice in a state of no activity, it may be recognized as a situation in which a third party invades.

Next, the conversational history context value means that a conversation history with the previous user is stored and conversation is performed accordingly. For example, when a chatbot says that it is hungry at 2 o'clock, the chatbot will be able to say to ask for food at about 3 o'clock.

Finally, the physical context value may be related to a companion animal's health state or whether or not the companion sleeps. For example, when the companion animal shows a behavior such as walking around without reason, defecating, or bumping into something, the physical context value indicates a value representing dementia or bad health.

In addition, in an optional embodiment, the situation information may be corrected by applying a chatting log previously performed in the process of calculating the situation information.

Finally, the user terminal 100 calculates a behavior pattern variable based on the basic emotion variable and the situation variable (S123).

In this case, the user terminal 100 analyzes the basic emotion variable and the situational variable to determine a behavior currently performed by a companion animal and calculates the behavior pattern variable.

In this case, a behavior that is currently performed includes an extroverted behavior, a passive behavior, and an aggressive behavior. For example, the extroverted behavior refers to a friendly behavior such as sniffing and turning head, and the passive behavior refers to a behavior performed when a companion animal feels suspicion, alert, anxious, or stress (for example, snoring, licking a nose, trembling, or so on), and the aggressive behavior indicates that a companion animal is in a state of threatening a partner or expressing anger.

In an additional embodiment, the above variables are corrected through individual additional information such as species, age, and health status of the companion animal. Through this, a chatbot customized for each companion animal may be implemented.

Figure 5:
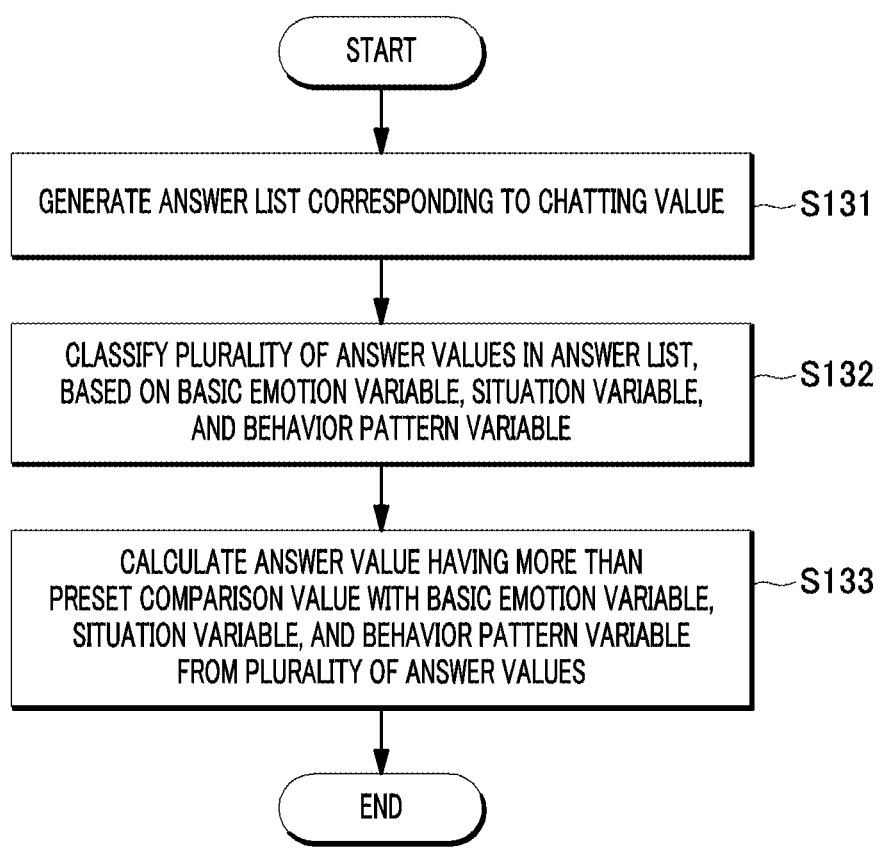
FIG. 5 is an operational flowchart illustrating a process of calculating an answer value corresponding to a user's chatting value, according to an embodiment of the present disclosure.

FIG. 5 is a operational flowchart illustrating a process of calculating an answer value corresponding to a user's chatting value, according to an embodiment of the present disclosure.

Referring to FIG. 5, the user terminal 100 generates an answer list corresponding to a chatting value (S131).

In this case, the user terminal 100 extracts a word constituting the chatting value and searches for an answer value associated with the extracted word to generate the answer list.

The user terminal 100 classifies a plurality of answer values in the answer list, based on a basic emotion variable, a situation variable, and a behavior pattern variable (S132).

The answer value is previously given a value corresponding to each of the basic emotion variable, the situation variable, and the behavior pattern variable.

Finally, the user terminal 100 calculates an answer value having more than a preset comparison value with the basic emotion variable, the situation variable, and the behavior pattern variable from the plurality of answer values (S133).

In this case, the user terminal 100 calculates a comparison value by comparing the basic emotion variable, the situation variable, and the behavior pattern variable calculated based on voice information and activity amount information with a variable of the answer value.

FIGS. 6A to 6E are diagrams illustrating an additional service provided in connection with a chatbot and an interface therefor, according to an embodiment of the present disclosure.

In this case, FIG. 6A is described above in the process of providing a chatbot, and thus, redundant descriptions thereof are omitted.

First, FIG. 6B illustrates an example of a diary interface that may be provided as an optional embodiment.

In this case, the diary interface includes a mood state region 521 representing a companion animal's mood, a photograph region 522 representing a companion animal's photograph, a text diary region 523 generated by a user's input, and a review region 524 in which another user reads a diary and writes a review.

In this case, the mood state region 521 representing a companion animal's mood may be provided in the form of a preset icon and is determined by a basic emotion variable calculated based on voice information and activity amount information received from the IOT device 200.

In addition, the written diary may be uploaded to a separate server through the communication module 110 or may also be shared by the user terminal 100 accessing another user terminal 100.

Figure 6C:
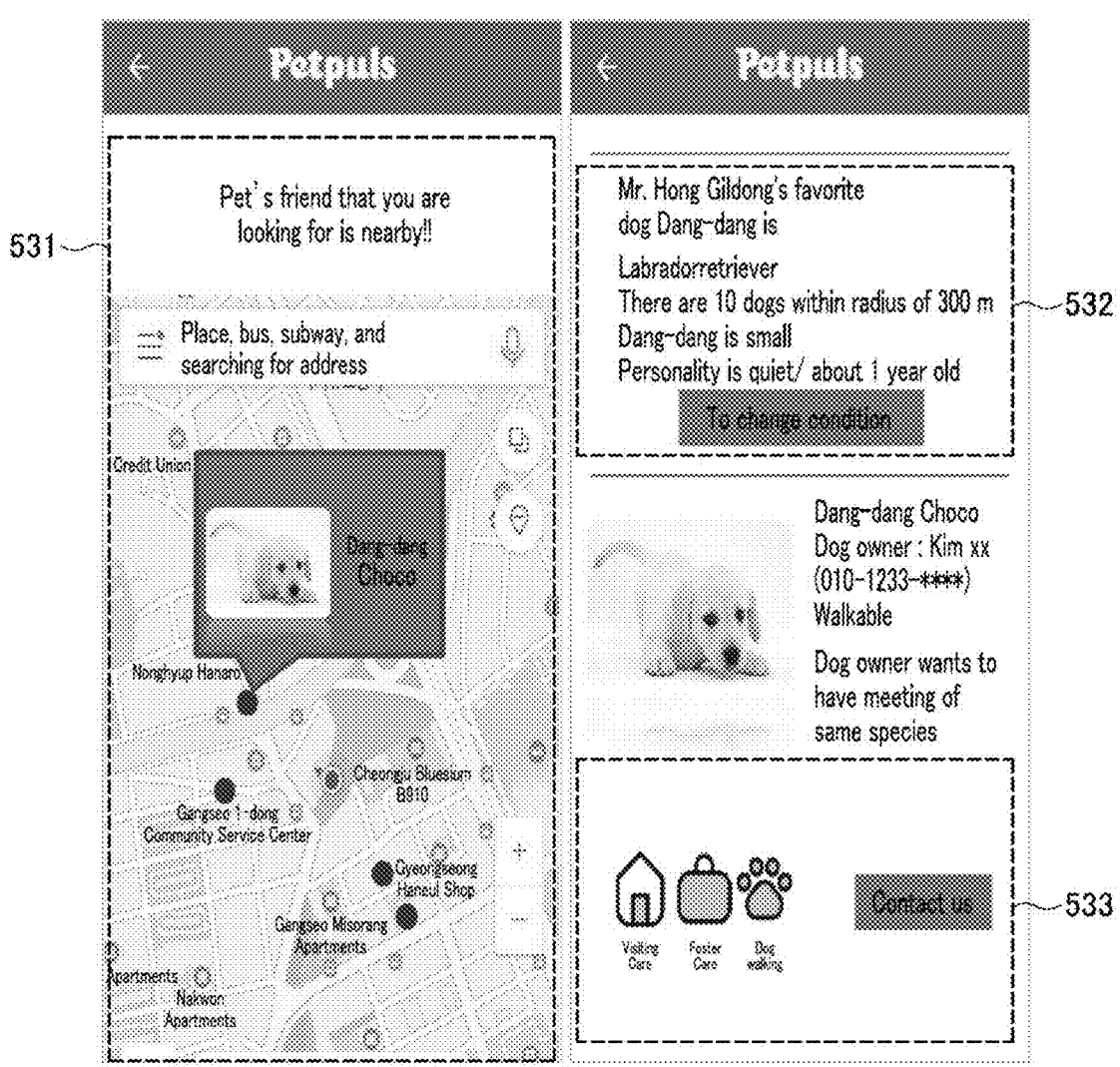
FIG. 6C is a diagram illustrating an example of an additional service provided in connection with a chatbot and an interface therefor, according to an embodiment of the present disclosure.

FIG. 6C illustrates an example of a friend-finding interface that may be provided as an optional embodiment.

In this case, the friend-finding interface includes a map region 531 representing a position of a user who wants to find a companion animal's friend, a profile region 532 for a companion animal that finds a friend, and a contact exchange region provided with a button for exchanging contacts (533).

In this case, the map region 531 displays where a companion animal is currently through position information of the companion animal which is generated through a GPS module included in the IOT device 200.

Figure 6D:
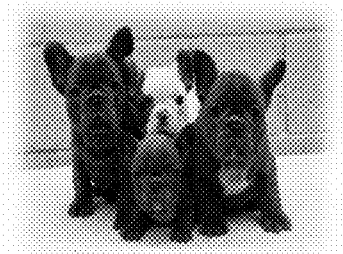
FIG. 6D is a diagram illustrating an example of an additional service provided in connection with a chatbot and an interface therefor, according to an embodiment of the present disclosure.

FIG. 6D illustrates an example of a companion animal recommendation interface for recommending a companion animal suitable for a user as an optional embodiment.

In this case, the companion animal recommendation interface may include an inspection region 541 for inspecting a user and a recommendation region 542 representing information on a companion animal corresponding to an examination result.

In this case, the companion animal recommendation interface analyzes a user's propensity through the inspection region 541 and recommends a companion animal through an average basic emotion variable, a situational variable, and a behavior pattern variable of each species of companion animal previously stored in the database 140.

Figure 6E:
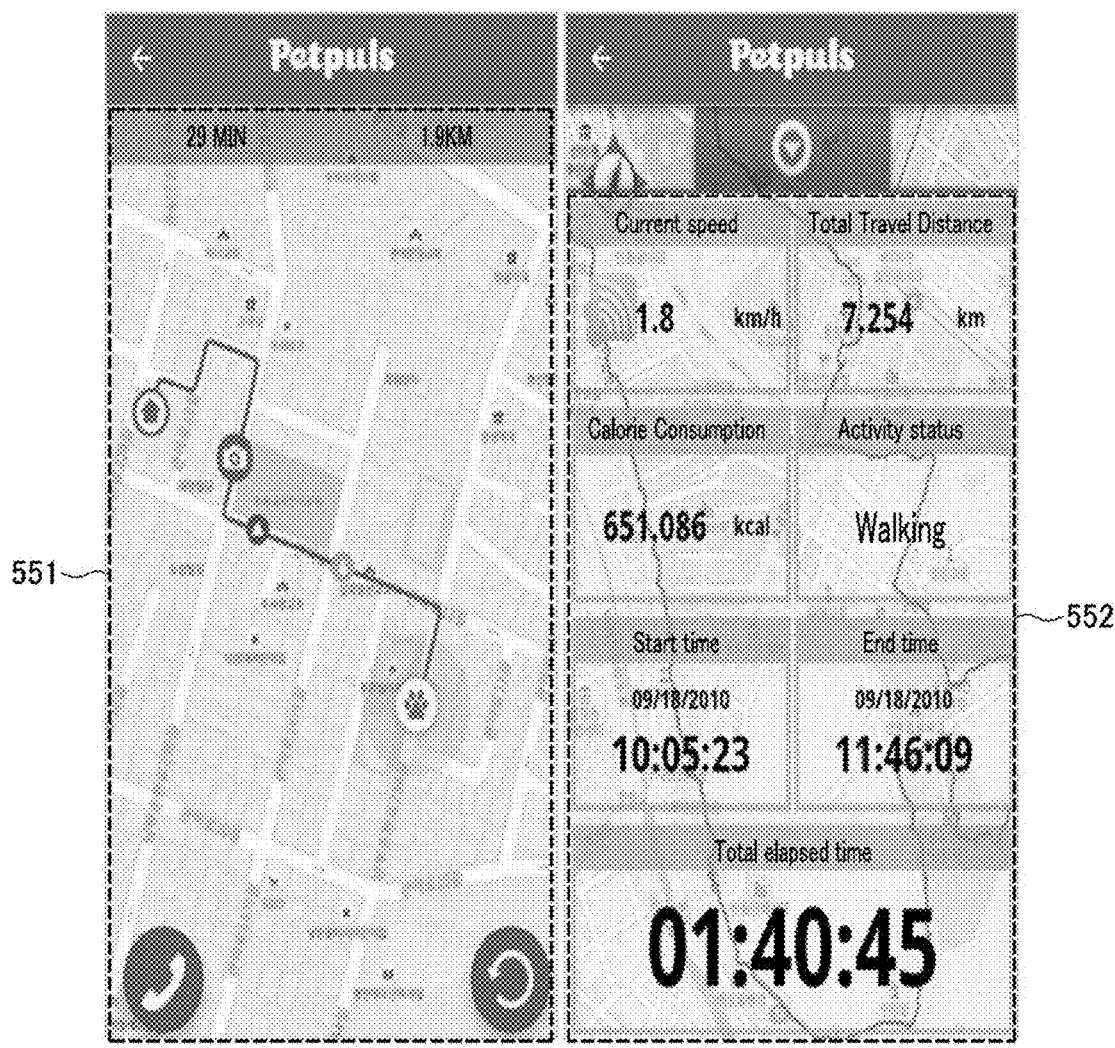
FIG. 6E is a diagram illustrating an example of an additional service provided in connection with a chatbot and an interface therefor, according to an embodiment of the present disclosure.

Finally, FIG. 6E illustrates an example of a walking interface for assisting walking with a companion animal as an optional embodiment.

In this case, the walking interface includes a path region 551 representing a walking path through a map and a walking result region 552 for calculating and displaying a result value of walking.

In this case, the walking path displayed in the path region 551 is calculated based on a companion animal's exercise ability, and a gain that may be obtained as a result of walking based on species, size, age, and previously measured activity amount information of the companion animal is displayed in the walking result region 552.

Although not illustrated in the above drawings, in an optional embodiment, a function of notifying a place where a user may go together with a companion animal in a nearby region based on position information, a function of recommending a health state and diet based on information on a companion animal, a function of a community webzine that provides information on a companion animal, or so on may be provided.

In addition, the IOT device described above may be operated through the user terminal 100 in connection with another IOT device (for example, an automatic feeding device).

The foregoing description of the present disclosure is for illustration, and those skilled in the art to which the present disclosure pertains will be able to understand that the present disclosure may be easily modified into other specific forms without changing the technical idea or essential features of the present disclosure. Therefore, it should be understood that the embodiments described above are illustrative in all respects and not restrictive. For example, each component described as a single type may be implemented in a distributed manner, and likewise, components described in a distributed manner may also be implemented in a combined form.

The scope of the present disclosure is represented by the following claims rather than the above detailed description, and all changes or modifications derived from the meaning and scope of the claims and their equivalent concepts should be interpreted as being included in the scope of the present disclosure.

What is claimed is:

1. A method of operating a chatbot based on a companion animal's emotion by using a user terminal, the method comprising:
   receiving voice information and activity amount information from an Internet of things (IOT) device when receiving a chatting value from a user;
   calculating a basic emotion variable, a situation variable, and a behavior pattern variable based on the voice information and the activity amount information; and
   searching for an answer value corresponding to the chatting value under conditions of the basic emotion variable, the situation variable, and the behavior pattern variable to output the searched answer value,
   wherein the IOT device includes a microphone and a behavior sensor and generates the voice information and the activity amount information by detecting a crying sound and a behavior of the companion animal wearing the IOT device.

2. The method of claim 1,
   wherein a chatting interface for performing one of reception and display of a text from the user before receiving the voice information and the activity amount information is provided, and
   wherein the chatting interface includes a chatting region in which chatting details are uploaded and a keyboard region in which the chatting value is generated.

3. The method of claim 1,
   wherein calculating the basic emotion variable, the situation variable, and the behavior pattern variable includes:
   calculating the basic emotion variable by analyzing the voice information;
   calculating the situation variable based on the activity amount information; and
   calculating the behavior pattern variable based on the basic emotion variable and the situation variable.

4. The method of claim 3,
   wherein calculating the basic emotion variable includes analyzing the voice information to calculate the basic emotion variable representing a score for the companion animal's plurality of emotions which include at least stability, anxiety, anger, sadness, and happiness.

5. The method of claim 3,
   wherein calculating the situation variable includes analyzing the activity amount information to calculate situation information on a situation that the companion animal currently experiences, and
   wherein the situation information includes an environmental context value for the companion animal's neighborhood, a conversational history context value, and a physical context value.

6. The method of claim 5,
   wherein the situation information is corrected by applying a chatting log generated by chatting previously conducted in a process of calculating the conversational history context value.

7. The method of claim 3,
   wherein calculating the behavior pattern variable includes calculating the behavior pattern variable by analyzing the basic emotion variable and the situation variable and determining a behavior that the companion animal currently performs, and
   wherein a type of the behavior that the companion currently performs includes an extroverted behavior, a passive behavior, and an aggressive behavior.

8. The method of claim 1,
wherein searching for the answer value includes:
generating an answer list corresponding to the chatting value;
classifying a plurality of answer values in the answer list based on the basic emotion variable, the situation variable, and the behavior pattern variable; and
calculating an answer value having more than a preset comparison value with the basic emotion variable, the situation variable, and the behavior pattern variable from the plurality of answer values.

9. The method of claim 8,
wherein in generating the answer list, the answer list is generated by extracting a word constituting the chatting value and by searching for an answer value associated with the extracted word.

10. The method of claim 8,
wherein the answer value is given a value corresponding to each variable of the basic emotion variable, the situation variable, and the behavior pattern variable, and
wherein, in calculating the answer value, the comparison value is calculated by comparing the basic emotion variable, the situation variable, and the behavior pattern variable calculated based on the voice information and the activity amount information with a variable of the answer value.

11. The method of claim 1,
wherein, after searching for an answer value, whether or not the answer value is suitable is received from the user, and when the answer value is suitable for the chatting value, the chatting value and the voice information and activity amount information are stored to correct an algorithm for calculating the basic emotion variable, the situation variable, and the behavior pattern variable.

12. The method of claim 1,
wherein the IOT device includes a global positioning system (GPS) module to generate position information, and
wherein, in calculating a basic emotion variable, a situation variable, and a behavior pattern variable, the position information is further received from the IOT device to correct the situation variable.

13. A chatbot system comprising:
an IOT device including a microphone and a behavior sensor to generate voice information and activity amount information by detecting a crying sound and behavior of a companion animal worn to the IOT device; and
a user terminal that, when a chatting value is input from a user, receives the voice information and the activity amount information from the IOT device, calculates a basic emotion variable, a situation variable, and a behavior pattern variable based on the voice information and the activity amount information, searches for an answer value corresponding to the chatting value under conditions of the basic emotion variable, the situation variable, and the behavior pattern variable, and outputs the searched answer value.

14. The method of claim 13,
wherein the IOT device includes a GPS module to provide position information to the user terminal, and
wherein the user terminal corrects the situation variable based on the position information.

15. A non-transitory computer-readable storage medium comprising:
a program for performing the method of operating the chatbot based on the companion animal's emotion according to claim 1.

\* \* \* \* \*